H. E. GRIESHABER.
TORPEDO LAUNCHING APPARATUS.
APPLICATION FILED JULY 30, 1917.
1,327,614.
Patented Jan. 13, 1920.
8 SHEETS—SHEET 1.
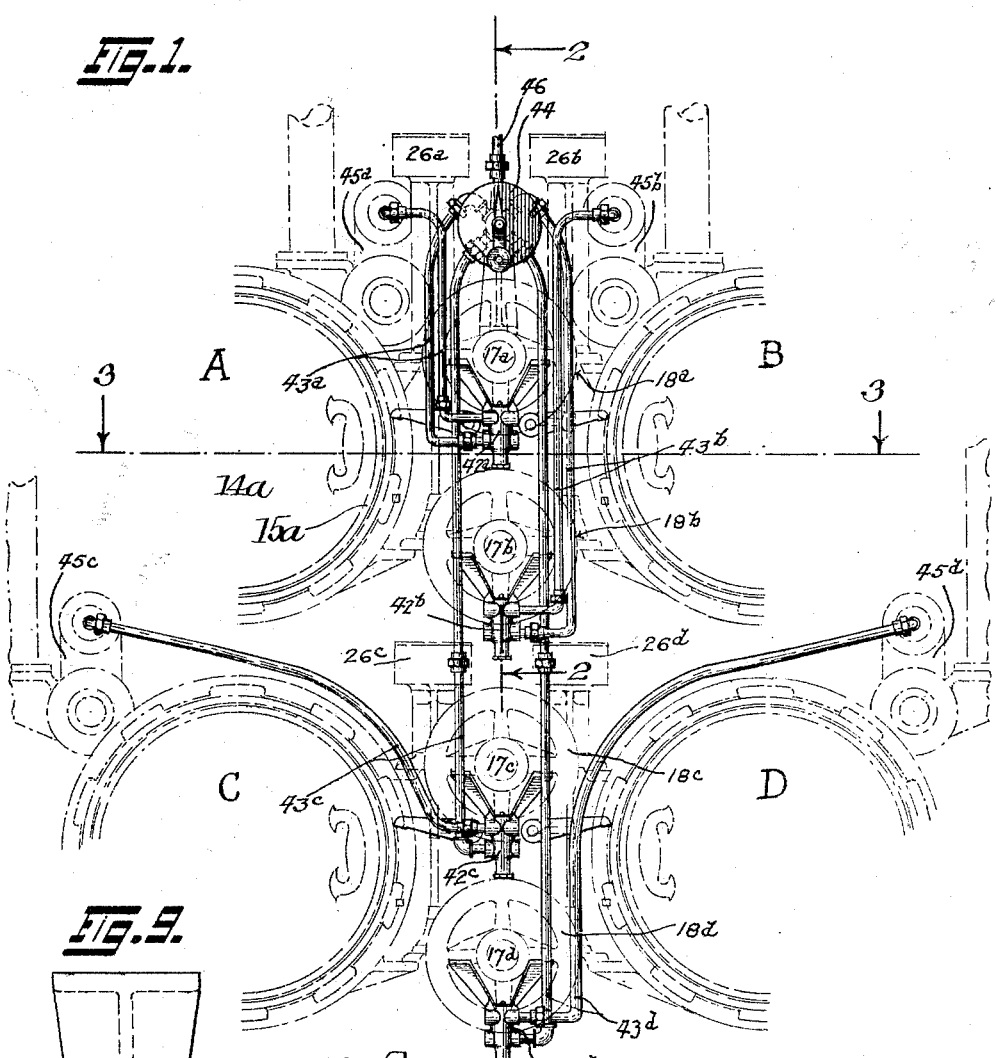
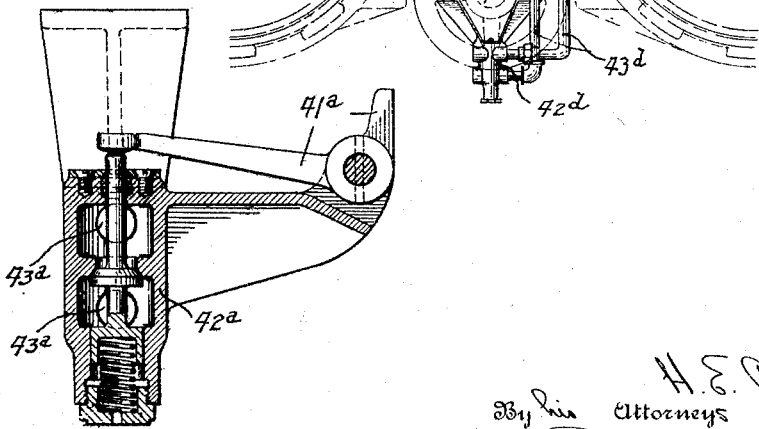

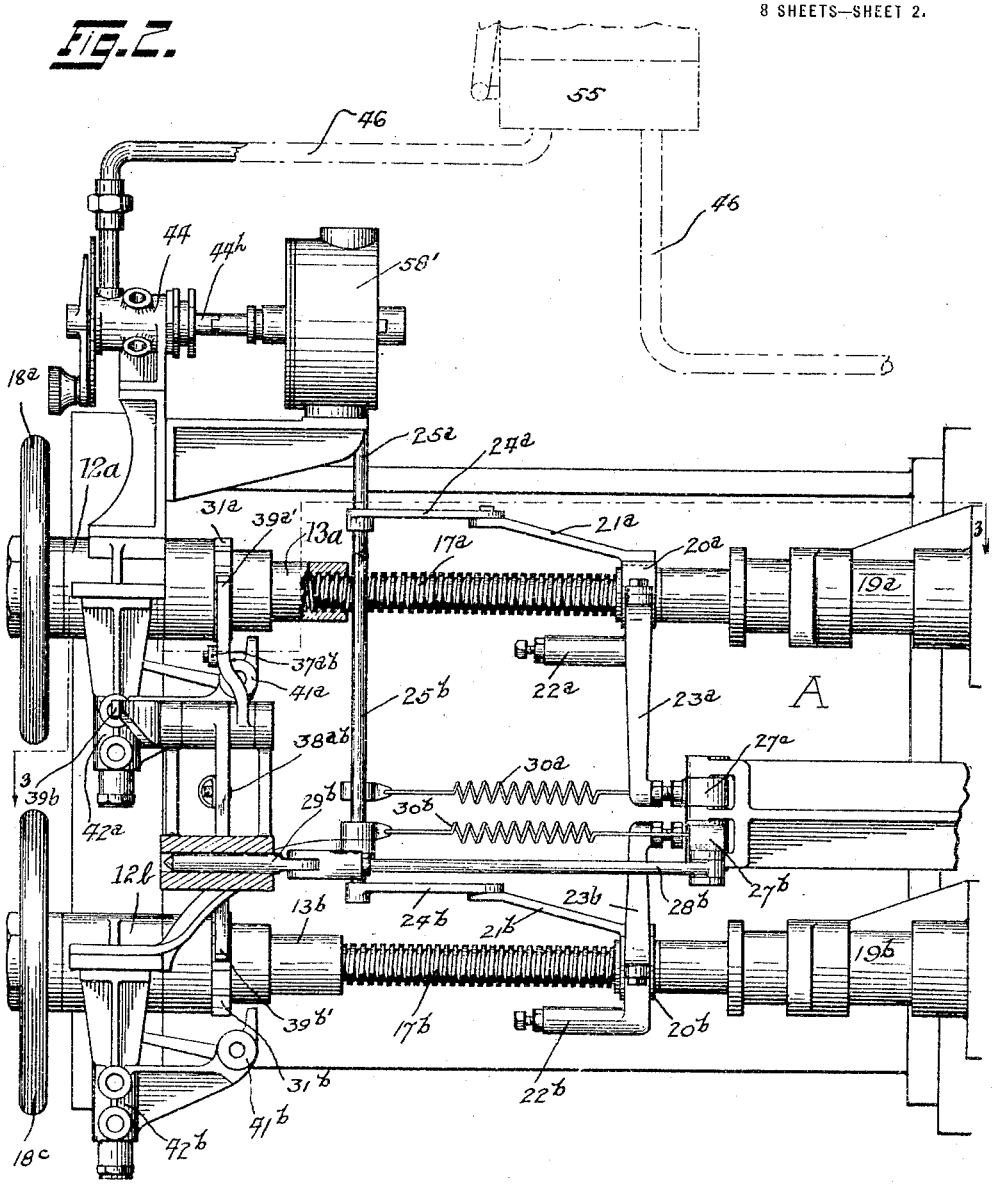

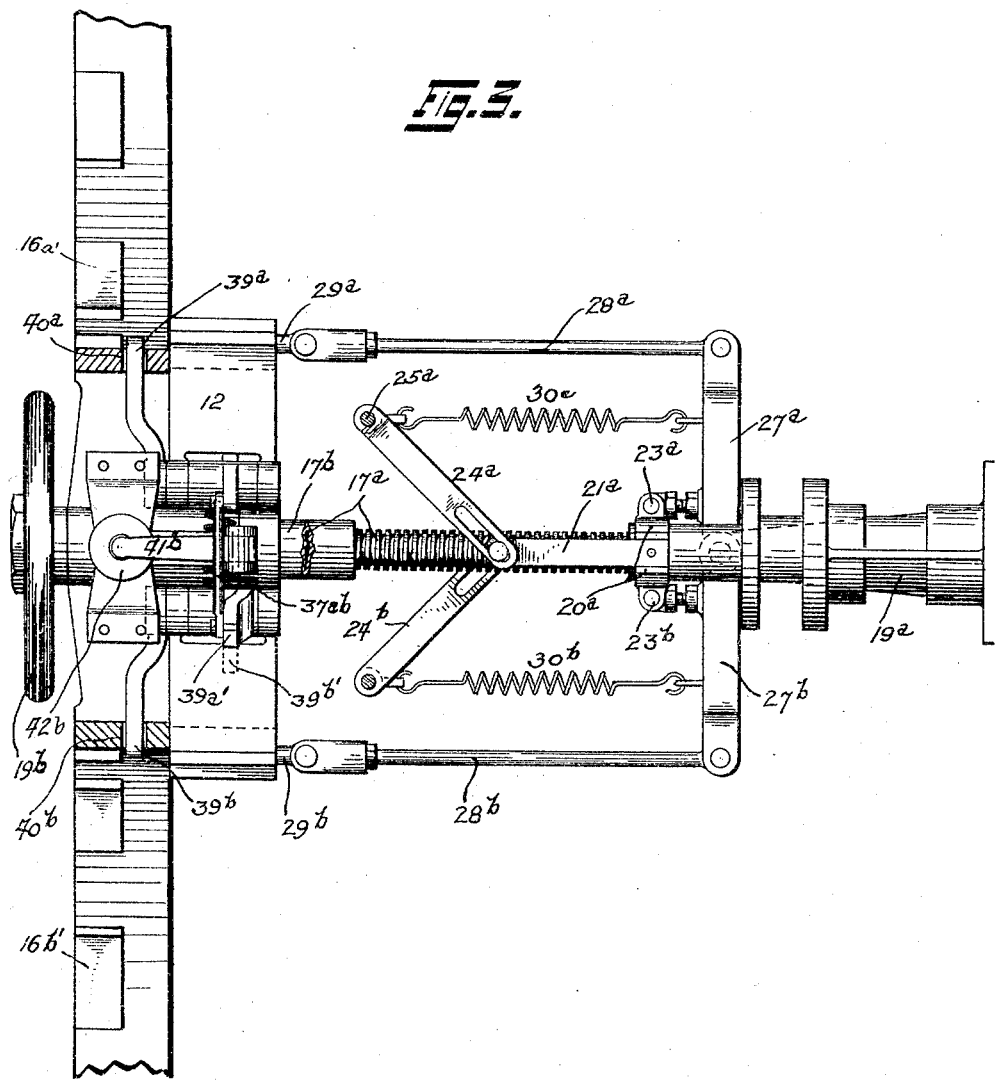

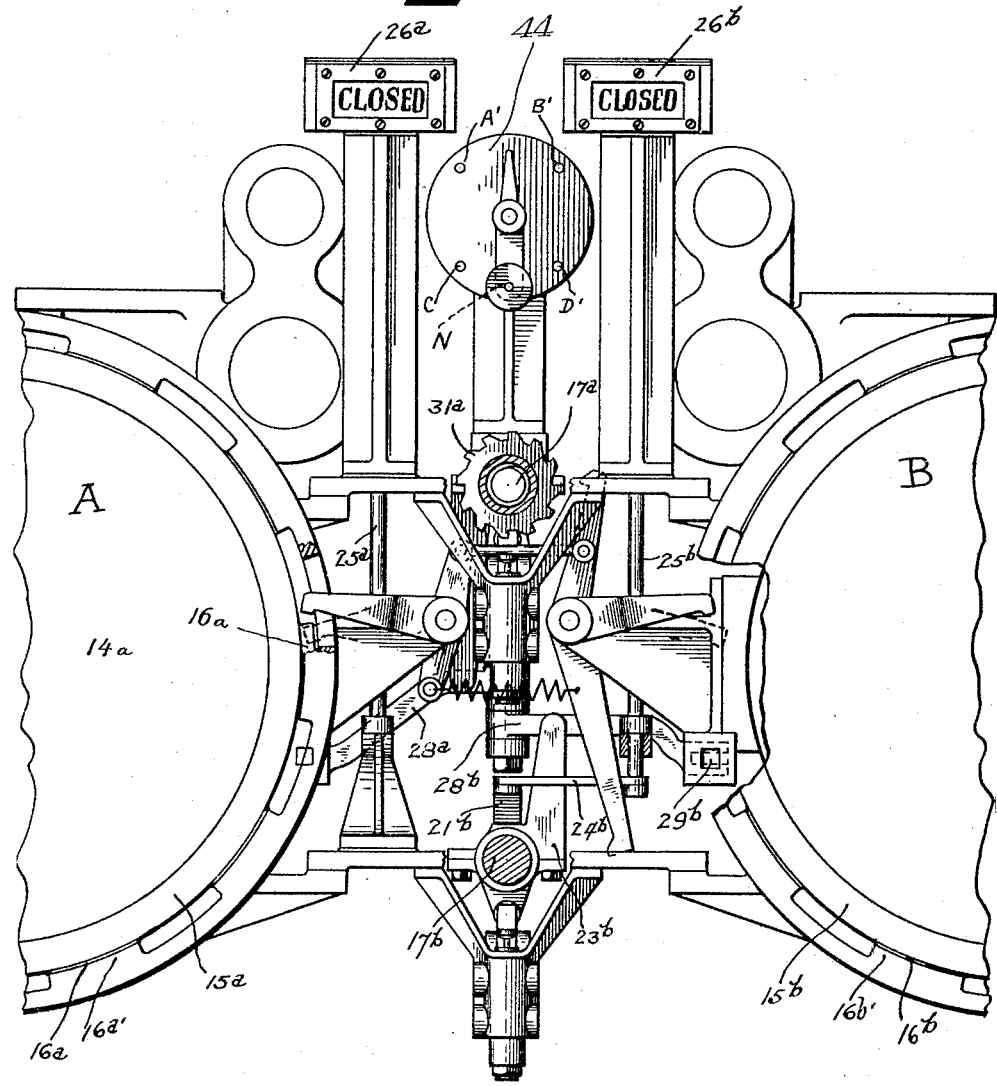

H. E. GRIESHABER.
TORPEDO LAUNCHING APPARATUS.
APPLICATION FILED JULY 30, 1917.
1,327,614.
Patented Jan. 13, 1920.
8 SHEETS—SHEET 5.
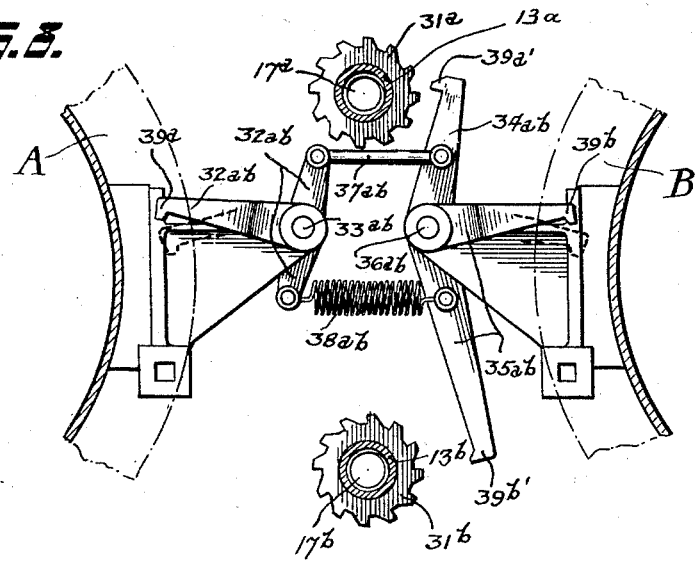
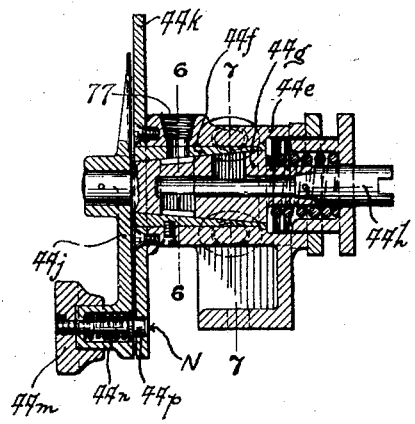
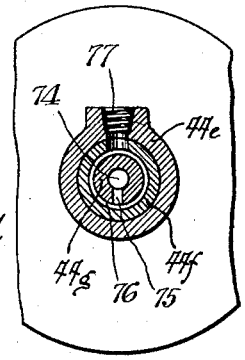
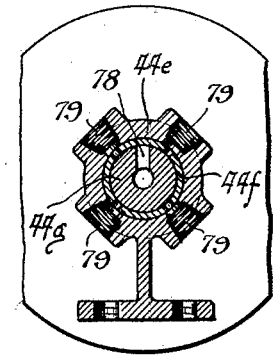
Inventor
H. E. Grieshaber,
By his Attorneys

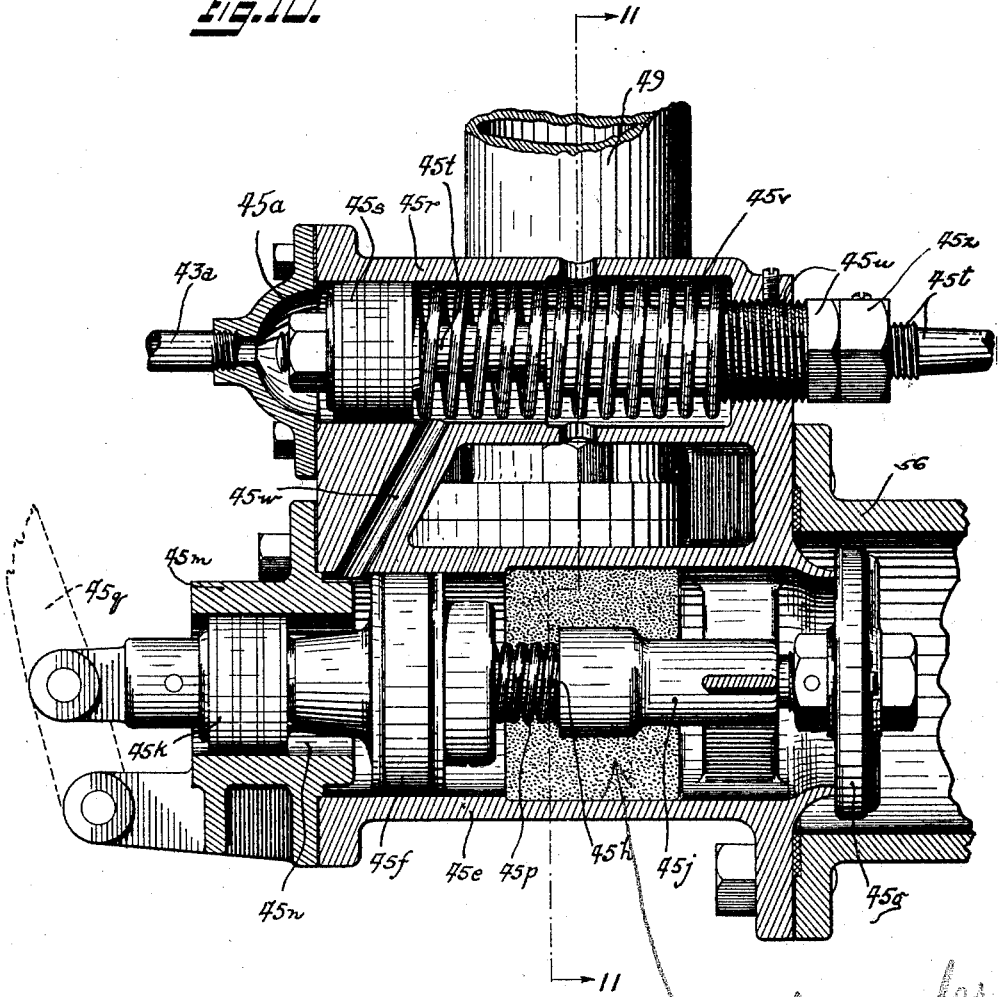

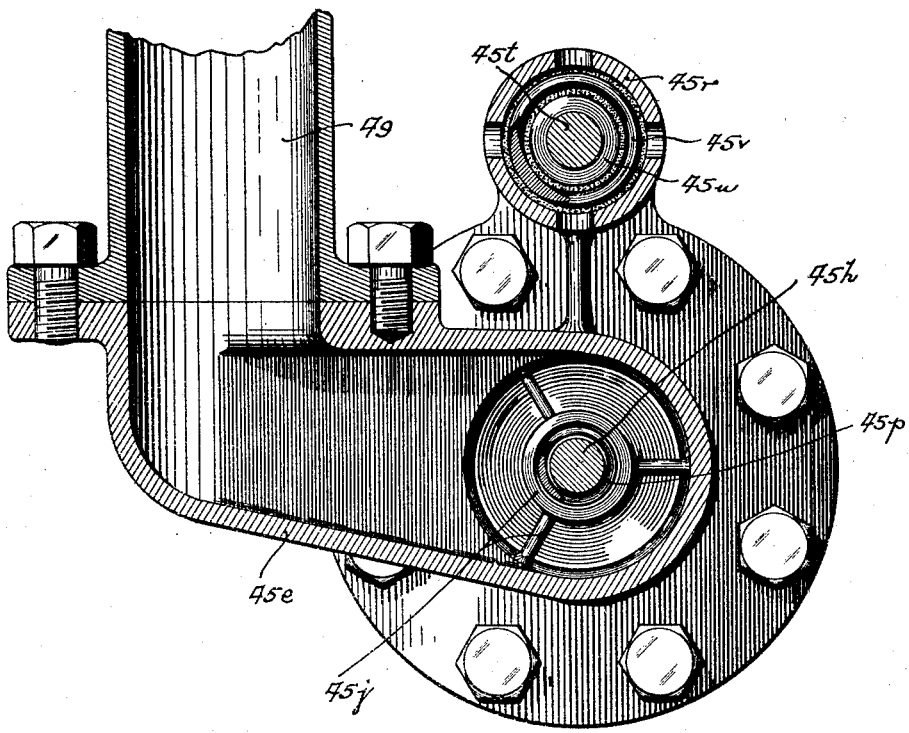

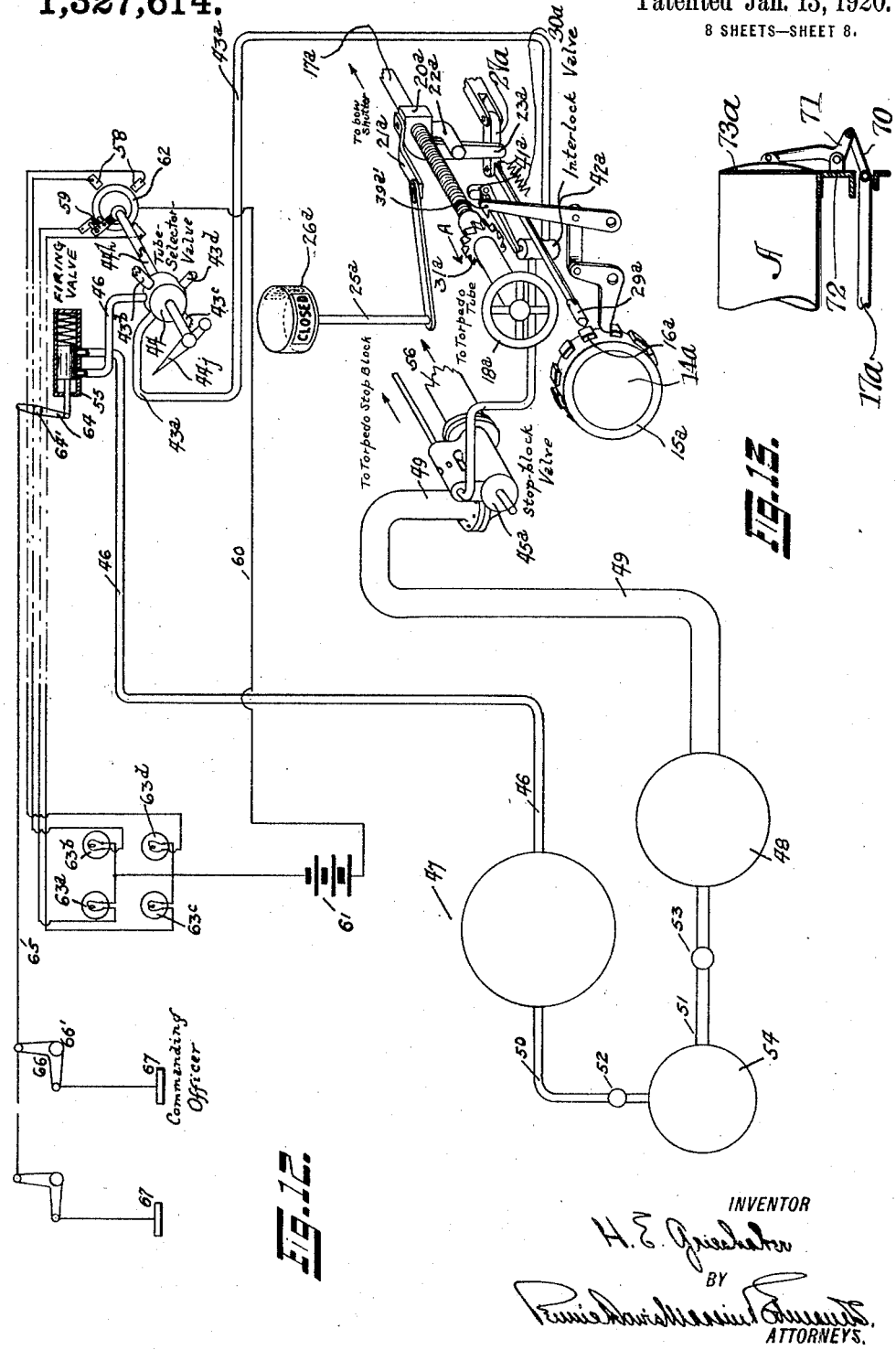

UNITED STATES PATENT OFFICE.

HUGO E. GRIESHABER, OF NEW LONDON, CONNECTICUT, ASSIGNOR TO ELECTRIC BOAT COMPANY, A CORPORATION OF NEW JERSEY.

TORPEDO-LAUNCHING APPARATUS.

1,327,614. Specification of Letters Patent. Patented Jan. 13, 1920.

Application filed July 30. 1917. Serial No. 183,427.

*To all whom it may concern:*

Be it known that I, HUGO E. GRIESHABER, a citizen of the United States, residing at New London, in the county of New London, State of Connecticut, have invented certain new and useful Improvements in Torpedo-Launching Apparatus; and I do hereby declare the following to be a full, clear, and exact description of the invention, such as will enable others skilled in the art to which it appertains to make and use the same.

This invention relates to improvements in mechanism for firing torpedoes and is particularly applicable to installations in which compressed air is admitted to the rear portion of a torpedo-tube to expel a torpedo therefrom and in which the firing of the torpedoes may be controlled from one or more distant stations. Certain of the features of the invention are applicable to torpedo-tube installations irrespective of the number of tubes employed therein, whereas other features are applicable only to installations of two or more tubes, as for instance, a group of four parallel tubes arranged at the bow of a submarine boat.

One of the features of the invention involves the provision of selecting mechanism for use in connection with a group of several torpedo-tubes so arranged that the selecting mechanism may be positioned to select the tube which is to be fired. The setting of the selecting mechanism in this manner establishes an operative connection to the selected tube for the propelling or controlling medium employed in firing that tube and at the same time renders all of the other tubes inoperative. Such a selecting mechanism is preferably mounted closely adjacent to the tubes and the gunner first prepares a tube for firing and then moves the operating member of the selecting mechanism to the position appropriate for firing the tube which has been made ready. When the actual firing of the torpedoes is to be effected from a point distant from the tubes, such, for instance, as the conning tower of a boat, the selecting mechanism has combined therewith certain signaling devices whereby the setting of the selecting mechanism in any one of its several operative positions transmits a signal to the firing station indicating that one of the tubes is in readiness for firing and also indicating which one of the several tubes it is that has been so prepared. When compressed air is used for expelling the torpedoes from the tubes, the selecting mechanism consists preferably of a distributing valve adapted to establish a connection for compressed air from a suitable source of supply to any one of a plurality of controlling mechanisms each of which controls the supply of compressed air to one of the several torpedo tubes. The signaling devices may conveniently consist of a plurality of electric lamps located at the firing station and contacts associated with the movable member of the distributing valve arranged to close a circuit through that one of the several signaling lamps which corresponds to the position to which the movable member of the distributer has been moved.

Another feature of the invention involves the provision of muzzle and breech doors for a torpedo-tube so interlocked that one can be opened only when the other is locked closed and mechanism for expelling the torpedo from the tube rendered operative only when the muzzle door is open and the breech door locked closed. When compressed air is employed for expelling the torpedo from the tube as is usual, an interlocking valve is placed in the conduit carrying the compressed air for operating or controlling the torpedo tube and this valve is normally closed but is opened by the movement of the door operating mechanism to open the muzzle door and lock the breech door. This construction involves the provision of an individual interlocking valve for each one of the several torpedo tubes, which valve remains closed at all times except when the tube is ready to be fired, at which time the valve is automatically opened by the mechanism which opens the muzzle door and locks the breech door of that tube.

The invention also involves the provision of an improved form of interlocking mechanism between the breech and muzzle doors of the tube or tubes, this mechanism being of a simple and rugged construction readily manufactured and installed at low cost and reliable and efficient in its operation.

The invention also involves the provision of a signaling device for a torpedo-tube or one for each of a plurality of such tubes adapted to give an indication to a tube-serving gunner as to whether or not the corresponding tube is in condition for firing. This signaling device is automatic in its operation and is preferably controlled directly by the door-operating mechanism; when the muzzle door is opened, locking the breech door and opening the compressed air conduit of the corresponding tube, a distinct signal is given to indicate that the tube is in readiness for firing.

The combination of all the parts above referred to safeguards the operation of the torpedo tubes under all conditions. If the gunner does not prepare for firing the tube he has been ordered to prepare, this is shown by the illumination of a signal lamp at the firing station other than the one corresponding to the tube which should have been prepared. If the muzzle-door of the tube is not entirely open, the interlocking valve above referred to will not be opened and the compressed air for firing cannot pass. If the movable member of the selector valve above referred to has not been set in the position corresponding to the tube which has been prepared for firing, the compressed air cannot pass through the selector to the open interlock valve. On the other hand, if all parts are in the proper positions, the proper indications will appear at the firing station and at the gunner's station and when the air supply is opened, the air will flow through the selector and the proper interlock valve to the operating mechanism of the appropriate tube.

Other features of the invention together with the advantages inherent therein will be understood by reference to the following description in connection with the accompanying drawings showing the construction which constitutes the preferred embodiment of the invention. In these drawings, Figure 1 is a front view of the mechanism showing the piping and certain of the parts in full lines and the doors of the tubes and certain other parts in broken lines for the sake of clearness; Fig. 2 is a vertical section on line 2—2 of Fig. 1 showing in side elevation the upper left-hand tube of the four tubes illustrated in Fig. 1; Fig. 3 is a horizontal section on line 3—3 of Figs. 1 and 2; Fig. 4 is an enlarged detail view of certain of the parts illustrated in Fig. 1; Fig. 5 is a central section of the tube selector valve; Figs. 6 and 7 are transverse sections on lines 6—6 and 7—7 respectively of Fig. 5; Fig. 8 is a view similar to Fig. 4 showing portions of the interlocking mechanism; Fig. 9 is an enlarged detail sectional view showing the interior construction of the interlock valve; Fig. 10 is an enlarged sectional view showing the interior construction of the stop block valve; Fig. 11 is a sectional view on line 11—11 of Fig. 10; Fig. 12 is a diagrammatic view showing the inter-relation of the parts for firing the upper left-hand one of the four tubes shown in Fig. 1; and Fig. 13 is a detail view supplementing Fig. 12 and showing the muzzle door and the connection thereto for opening it.

The references A, B, C and D are applied respectively to the upper left-hand, upper right-hand, lower left-hand and lower right-hand tubes shown in Fig. 1, and hereinafter those parts associated with tube A and duplicates of which are associated with each of the other tubes, will be referred to by reference numerals immediately followed by the letter $a$; and the duplicate parts which are associated with tubes B, C and D will not be referred to individually, it being understood that the description of a part indicated by a reference numeral followed by the letter $a$, applies also to a part indicated by the same reference numeral followed by the letter $b$, $c$ or $d$, such part being employed in connection with the tube B, C or D indicated by the reference letter.

Tube A is provided with the usual hinged breech door $14^a$. The peripheral surface of this door is threaded to coact with threads on the interior of a breech ring $15^a$ having a plurality of locking lugs or segments $16^a$ of the customary type on its exterior surface. When the breech door is closed, the ring $15^a$ is rotated a small amount so as to carry the locking lugs or segments thereon behind coacting lugs or segments $16^{a\prime}$ (Fig. 3) formed on the interior of the tube at the breech opening thereof. An operating shaft is provided for operating or controlling the doors of each of the tubes. The four operating shafts are shown in Fig. 1 at $17^a$, $17^b$, $17^c$ and $17^d$, and each of them is movable axially though incapable of rotational movement. Any one of the four shafts may be operated to control the opening and closing of the doors of the corresponding tube by the gunner whose station is at the breech ends of the tubes. The operating shaft $17^a$ is mounted in a suitable bearing $19^a$. The shaft is threaded as shown, its threaded portion being received within an interiorly threaded sleeve $13^a$ mounted for rotation in the frame $12^a$. A hand-wheel $18^a$ is secured to the sleeve. When the hand-wheel is rotated, causing rotation of sleeve $13^a$, the shaft $17^a$ is moved axially by means of the coacting threads on the shaft and sleeve. To prevent rotation of shaft $17^a$ the same is splined in any suitable manner (not shown) to the bearing $19^a$. To limit the axial movement of the shaft, the sleeve $13^a$ may carry therein a suitable stop to coöperate with the inboard end of the shaft. A collar $20^a$ is secured on shaft $17^a$ and carries an arm $21^a$, an arm $22^a$ and an arm $23^a$. The collar and its arms corresponding to the tube A, and those corresponding to the tube B, are shown in elevation in Fig. 2 and in plan view in Fig. 3. Arm $21^a$ is connected by a pin and slot connection to one end of an arm 24$^a$, the other end of which is fixed to a vertical shaft 25$^a$. The upper end of this shaft 25$^a$ carries the movable member of a signaling device 26$^a$. This signaling device may consist of a drum rotating in a suitable casing and having the words "Closed" and "Open" printed thereon, the parts being so arranged that the word "Closed" is displayed through a glass in the casing of the signaling device when the collar 21$^a$ is in one of its extreme positions and the word "Open" when the collar is in the other extreme position.

The second arm 23$^a$ of the collar 20$^a$ extends downwardly and is adapted to operate a lever 27$^a$ which is pivotally mounted upon a suitable support in a horizontal position below the shaft 17$^a$. The free end of this lever 27$^a$ is connected by a link 28$^a$ to a locking bolt 29$^a$ adapted to move back and forth in an opening in the frame 12 adjacent to the breech of the tube A and to have its end projected into and withdrawn from an opening in the ring 15$^a$. A spring 30$^a$ is connected at one end to the lever 27$^a$ and at the other end to a sleeve loose on the shaft 25$^a$. This spring tends to move the locking bolt 29$^a$ into its opening in the breech ring 15$^a$ and holds the lever 27$^a$ in contact with the arm 23$^a$ when the latter is near its extreme position.

Referring now to Figs. 12 and 13, the shaft 17$^a$ is extended through the bearings shown in Fig. 2 to the muzzle end of the tube. Its extreme end is connected by a link 70 to a lever 71 which is pivotally mounted on the bulkhead casting 72. The other end of lever 71 is secured to the muzzle door 73$^a$ at the center of the door. When shaft 17$^a$ is non-rotatively moved in the direction of its axis as heretofore described, it operates through the lever 71 to open or close the muzzle door or cap 73$^a$. When shaft 17$^a$ is moved to the left in Fig. 2, the muzzle door 73 is opened and at the same time the breech door is locked in the closed position. This locking of the breech door is effected through movement of arm 23$^a$ with the collar 20$^a$, allowing lever 27$^a$ to be turned upon its pivot by spring 30$^a$ so that the locking bolt 29$^a$ is moved into the opening in the breech ring 16$^a$. At the same time, the movement of collar 20$^a$ actuates the gunner's signaling device 26$^a$ through the arm 21$^a$, link 24$^a$ and shaft 25$^a$ so that the signaling device will display the word "Open". Movement of shaft 17$^a$ in the opposite direction closes the muzzle door, withdraws the locking bolt 29$^a$ from the breech ring 15$^a$ and actuates the signaling device 26$^a$ to display the word "Closed". At the conclusion of this movement of the parts, the operator may turn the breech ring 15$^a$ so as to carry its segments opposite the spaces between the segments on the breech of the tube and thus permit the breech door to be swung on its pivot to the open position.

In addition to the interlock above described whereby the breech door is locked in a closed position when the muzzle door is opened, there is a second interlock for preventing opening of the muzzle door when the breech door is opened. For the purpose of effecting this interlock, a single mechanism is employed for two tubes located side by side, as for instance, the tubes A and B. This mechanism is shown in detail in Fig. 8. At the side of the tube A is a pivoted lever having three arms designated 32$^{ab}$ on Fig. 8. One arm 39$^a$ of this lever projects through an opening in the tube A and is adapted to coact with the ring surrounding the door of the tube so that when that ring is turned to lock the door in the closed position, the lever 32$^{ab}$ will be turned slightly on its pivot. The tube B has an opening at the breech end thereof to receive the end 39$^b$ of a two-arm lever 35$^{ab}$ which is pivotally mounted upon a bracket adjacent to the tube B in a manner closely similar to that employed in connection with the lever 32$^{ab}$. The pivot 36$^{ab}$ of the lever 35$^{ab}$ also serves as a pivotal support for a lever 34$^{ab}$ which is connected by a link 37$^{ab}$ with one arm of the lever 32$^{ab}$. Another arm of this latter lever is connected by a spring 38$^{ab}$ with the downwardly extending arm of the lever 35$^{ab}$. The end 39$^{a'}$ of lever 34$^{ab}$ has the form of a hook adapted to coact with the teeth of a gear 31$^a$ secured on the collar 13$^a$. The depending arm of the lever 35$^{ab}$ is similarly formed to coact with the teeth of a gear 31$^b$ secured on the collar 13$^b$.

The relation of these parts is such that when the ring of the breech door of tube A is turned to lock the door in the closed position, a lug on that ring engages the end 39$^a$ of the lever 32$^{ab}$ so as to rock that lever from the position shown in dotted lines in Fig. 8 to the position shown in full lines. When the lever is turned thus, it acts through the link 37$^{ab}$ to move the lever 34$^{ab}$ to the position shown in Fig. 8, in which it is out of coaction with the gear 31$^a$. The threaded sleeve or nut 13$^a$ is then free to be rotated by the operator in order to open the muzzle door. But if the ring of the breech door of tube A be turned to the position for opening the door, the end 39$^a$ of lever 32$^{ab}$ will assume the dotted line position under the influence of spring 38$^{ab}$ and in doing so will draw the end of lever 34$^{ab}$ into engagement with the teeth of gear 31$^a$. As a result, the operating sleeve 13$^a$ will be locked against rotation so that it will be impossible to open the muzzle door. In a similar manner, operation of the locking ring of the breech door of tube B actuates the lever 35$^{ab}$ to move the end 39$^{b'}$ of that lever into or out of engagement with the teeth of gear 31$^b$ to lock or release shaft 17$^b$ for actuating the muzzle door of tube B.

The collar 20$^a$ is provided with a third arm 22$^a$ as above described, and this arm is employed for actuating a valve controlling the supply of compressed air by which the firing of the tube is effected. When the collar 20$^a$ nears the end of its range of movement to the left in Fig. 2, its end engages a bell crank lever 41$^a$ and rocks that lever so as to open a passage for compressed air through an interlock valve 42$^a$. The construction which I prefer to employ in this valve is illustrated in Fig. 9. By reference to this figure and Fig. 12, it will be seen that the valve is inserted in a conduit 43$^a$ for compressed air, that the movable member of the valve is held by a spring against its seat so as to close the passage for compressed air through conduit 43$^a$, and that when the movable member is depressed by lever 41$^a$ against the tension of the spring, the compressed air may flow freely in the conduit 43$^a$ through the valve. The conduit 43$^a$ carries compressed air which is used for controlling the operation of a pneumatically actuated valve, which valve is adapted to admit compressed air to the torpedo tube to expel a torpedo therefrom. The conduit or pipe 43$^a$ is one of a plurality of pipes corresponding in number to the number of torpedo-tubes and leading from a tube selector valve. This tube selector valve is shown at 44 in Fig. 12 and its construction is illustrated in detail in Figs. 5, 6 and 7. Referring to these figures, it will be seen that the valve consists of a casing 44$^e$ within which is a conical bearing 44$^f$ for a rotary valve 44$^g$, which, at one end, has a reduced extension pinned to a shaft 44$^h$ and at its other end has a reduced extension pinned to a combined index and setting-arm 44$^j$. Secured to the casing 44$^e$ is a dial-plate 44$^k$ provided with five similar recesses A', B', C', D' (see Fig. 4) and N. On the setting-arm 44$^j$ is a boss, over which fits a knob 44$^m$ having a central pin which passes into a recess in the boss on the setting-arm. Within this recess is a spring 44$^n$ coiled about the pin and normally holding the knob 44$^m$ in the position shown in Fig. 5 with the end 44$^p$ of the pin in one of the openings in the dial-plate 44$^k$. The knob 44$^m$ may be pulled out against the tension of spring 44$^n$ to remove the end 44$^p$ of the pin from the opening in the dial-plate and then the setting-arm 44$^j$ may be turned one way or the other, carrying with it the rotary valve 44$^g$. Within the valve 44$^g$ is a central passage 74 communicating by means of a branch passage 75 (Fig. 6) with an annular passage 76, which passage is in communication at all times with an inlet port 77. The central passage 74 also communicates with a branch passage 78 (Fig. 7) and by turning the valve 44$^g$ as above described, this branch passage 78 may be placed in communication with any one of four ports 79. These ports 79 receive the ends of the conduits 43$^a$, 43$^b$, 43$^c$ and 43$^d$, corresponding to the four torpedo tubes A, B, C and D.

Compressed air enters the tube selector valve at the port 77 through a pipe 46 which is connected to a source of supply of compressed air indicated diagrammatically in Fig. 12 at 47. On a submarine boat, the pipe 46 may be in communication with the service line of the boat which usually carries compressed air at a pressure of 100 pounds. On Fig. 12, the tank 47 supplying the service line 46 is shown as connected to the main source of supply of compressed air, such as the usual compressed air flasks 54, by means of a pipe 50 in which is a suitable reducing valve 52.

The admission of air from the service line 46 to the tube selector valve 44 is controlled by a suitable valve which may be located at a distance from the torpedo tubes or may be arranged to be operated from a distance, as, for instance, from the conning tower of a submarine boat. In Fig. 12, a firing valve is shown for controlling the supply of compressed air to the tube selector valve 44, and this firing valve is arranged to be operated from a distant firing station. The valve is shown as consisting of a cylinder 55 connected in the pipe 46 and provided with a spring actuated piston which normally maintains the connection through the pipe 46 closed. The piston of this firing valve may be operated from a distant firing station in any suitable manner. In Fig. 12, the piston of the firing valve is shown as connected to a lever 64 pivoted at 64' and operated by a flexible connection 65 which leads to the firing station or to several such stations where it is provided with an operating device 67 connected to the flexible cable 65 through a bell crank lever 66 pivoted at 66'. By pulling down upon the operating device 67, the piston of the firing valve is moved against the tension of its spring to such a position that compressed air may flow freely through the pipe 46 to the tube selector valve 44.

Fig. 12 shows the signaling devices whereby an indication is given at the firing station to show the position in which the movable member of the tube selector valve has been set. The shaft 44$^h$ of the movable member of the tube selector valve is extended and carries an arm 59 on which are two contacts one of which is adapted to travel over a ring 62 and the other of which is adapted to engage any one of four contacts 58 spaced apart equally around the axis of shaft 44$^h$. These four contacts 58 are connected by wires to lamps 63$^a$, 63$^b$, 63$^c$ and 63$^d$, located at the firing station and the other side of each of the four lamps is connected to one side of a battery 61 whose opposite side is connected by a wire 60 to the ring 62. The arrangement of these parts is such that when the index of the tube selector valve is set in any one of its four operative positions, the arm 59 will contact with ring 62 and one of the four contacts 58 and in this way circuit is closed from the battery 61 through that one of the four lamps 63 which corresponds to the position in which the movable member of the tube selector valve has been set.

Assuming that the tube selector valve has been set in the position indicated in Fig. 12 and that the firing valve is in the open position, compressed air passes from the service line 46 through the firing valve and through the tube selector valve to the pipe $43^a$, and then through the interlock valve $42^a$ to a stop-block valve which is illustrated diagrammatically in Fig. 12 and shown in detail in Figs. 10 and 11. This air operates the stop-block valve so as to admit compressed air from a conduit 49 to a conduit 56 leading to the breech end of the torpedo-tube where the air acts upon the torpedo to expel it from the tube. Conduit 49 is connected to a source of supply of compressed air 48 preferably at a pressure higher than that in the service line 46, as for instance, 200 pounds. The tank 48 may be connected to the main source of supply 54 by means of a pipe 51 having a suitable reducing valve 53 therein.

The stop-block valve shown in Figs. 10, 11 and 12 is substantially the same as that illustrated in Letters Patent No. 1,094,963 granted April 28, 1914 to T. S. Bailey and therefore need not be described in detail. By reference to Figs. 10 and 11, it will be seen that the conduit $43^a$ leads to the cylinder $45^a$ of a piston $45^s$ which is positioned by a spring $45^v$. The rod $45^t$ of this piston is extended through the end of the cylinder $45^r$ and coacts with a stop-block extending into the torpedo-tube so as to prevent movement of the torpedo out of the tube until the stop-block has been withdrawn. Rod $45^t$ is guided within a bolt-sleeve $45^u$, and the rod has locked thereon a stop-nut $45^z$. When air is admitted to the cylinder $45^a$ through the conduit $43^a$, the piston $45^s$ is forced to the right in Fig. 10, and in doing so, it operates to withdraw the stop-block. Further movement of the piston carries it beyond a passage $45^w$ leading from cylinder $45^r$ to the lower cylinder and the air admitted to cylinder $45^r$ passes through this passage $45^w$ and acts upon a piston $45^f$ in the cylinder $45^e$ to move that piston to the right. The piston $45^f$ is connected by a rod $45^h$ passing through a bearing $45^j$ to a disk $45^g$ which normally closes the end of the cylinder $45^e$. Coiled about rod $45^h$ is a compression spring $45^p$.

The conduit 49 for the high pressure air enters the cylinder $45^e$, as shown in Figs. 9 and 10, and when the disk $45^g$ is forced to the right away from its seat, air passes into the conduit 56 leading to the torpedo-tube. Preferably, the rod of the piston $45^f$ is extended to the left and connected to a lever $45^q$ by which the parts moving within the cylinder $45^e$ may be operated manually. This extension of the piston rod has an auxiliary piston $45^k$ thereon of smaller diameter than the piston $45^f$ and adapted to move within an auxiliary cylinder $45^m$ formed in the end plate of the cylinder $45^e$.

The operation of the parts thus constructed has been indicated in connection with the foregoing description of the construction but may be summarized as follows: Normally, the muzzle door of say the torpedo-tube A is closed. The breech door may then be opened as the locking bolt $29^a$ for locking the breech door is withdrawn from the opening in the ring of the breech door. A torpedo having been placed in the tube, the breech door is closed and the locking ring is rotated a distance sufficient to carry its lugs behind the lugs on the breech of the tube. While the breech door is open, it is impossible to open the muzzle door, as rotation of the hand-wheel $18^a$ is prevented by the engagement of the end $39^{a'}$ of the lever $34^{ab}$ with the gear $31^a$ on the sleeve $13^a$ to which the operating wheel $18^a$ is fixed. However, as soon as the breech door is closed and its ring rotated to the locking position, the sleeve $13^a$ is unlocked to permit opening of the muzzle door. This unlocking of the sleeve $13^a$ is effected by the lever $32^{ab}$, whose end $39^a$ is engaged by one of the lugs on the locking ring of the breech door. The operator may then turn the wheel $18^a$ and in doing so causes axial movement of the shaft $17^a$ in a direction toward the operator. This axial movement of shaft $17^a$ operates to open the muzzle door and carries the collar $20^a$ along with it. The first portion of the axial movement of shaft $17^a$ operates to lock the breech door by permitting the spring $30^a$ to force the bolt $29^a$ into the opening provided for its reception in the locking ring. As the movement of shaft $17^a$ and collar $20^a$ is continued, the indicator $26^a$ is actuated to display the signal "Open," indicating that the muzzle door of the tube is in the open position. Near the end of the axial movement of shaft $17^a$, the arm $22^a$ thereon engages the lever $41^a$ and actuates that lever to open the interlock valve $42^a$. The gunner then moves the index $44^j$ of the tube selector valve to the position corresponding to the tube whose muzzle door has been opened, that is, the position marked "A" on the dial plate $45^k$, when the tube A has been prepared for firing. This establishes a connection for compressed air from the conduit 46 through the tube selector valve to the pipe 43ª leading to the interlock valve 42ª of the tube A. Also, in so positioning the index 44ʲ, the arm 59 of the signaling system is moved to the position for closing the circuit of battery 61 through the signal lamp 63ª at the firing station. The illumination of the lamp 63ª serves as a signal to indicate to the commanding officer that the tube A is in readiness for firing and at the appropriate time the officer pulls the actuating device 67. This operates to move the piston of the firing valve 55 so as to open a passage for compressed air from the service line 46 through the firing valve and then to the tube selector valve, through that valve to the pipe 43ª and through the interlock valve 42ª to the stop-block valve 45ª. This air entering the cylinder 45ʳ of the stop-block valve moves the piston 45ˢ so as to remove the stop from the path of the torpedo in the tube; the air in cylinder 45ʳ then passes through the passage 45ʷ to the cylinder 45ᵉ where it moves the piston 45ᶠ and disk 45ᵍ to the right so as to admit compressed air from the high pressure line 49 through the cylinder 45ᵉ and at a suitably reduced pressure to the conduit 56 and then to the breech end of the tube A. The high pressure air thus admitted to the torpedo-tube acts upon the torpedo therein so as to expel it from the tube.

After the torpedo has been fired, the operator turns wheel 18ª so as to close the muzzle door. Until this has been done, it is impossible to open the breech door since the latter is locked by the bolt 29ª. On turning the wheel 18ª to close the muzzle door, the shaft 17ª is retracted and in the first portion of its retractile movement, it releases the lever 41ª with the result that the interlock valve 42ª is closed by its spring. The continuation of the movement of shaft 17ª is accompanied by operation of the signaling device 26ª to display the word "Closed" indicating closure of the muzzle door. When the muzzle door has been closed, the bolt 29ª is withdrawn from the opening in the locking ring 15ª and the ring may then be turned to permit of opening the breech door 14ª. Such turning of the ring is accompanied by locking of the sleeve on which the handwheel 18ª is mounted by the end 39ª of the lever 34ᵃᵇ.

It will thus be seen that there is an entirely reliable and positive interlock between the breech door and muzzle door such that neither one may be opened except when the other is locked in the closed position, combined with an interlock for the air supply to the operating valve 45ª such that air cannot pass from the service line 46 to the operating valve except when the muzzle door is completely open. Also, the construction is such that the movable member of the tube selector valve must be placed in the position corresponding to the torpedo-tube which has been placed in readiness for firing. If the index 45ʲ of the tube selector valve has been placed in the wrong position, it will admit compressed air to one of the conduits 43 but not to the one whose interlock valve 42 has been opened as an incident to opening the muzzle door. The position to which the movable member of the tube selector valve is moved is indicated by the illumination of one of the signal lamps at the firing station so that the officer in charge of the firing of the torpedo will know which of the several tubes will be fired when he pulls the single controller at his station.

I claim:

1. In a torpedo launching apparatus, the combination of a tube, a breech-door, a muzzle-door, a rotatable member for opening and closing the muzzle-door, a locking device for said member, a locking device for the breech-door, means operated by opening the muzzle-door for actuating the locking device for the breech-door to lock that door, and means operated by opening the breech-door for actuating the locking device for said member to lock said member against rotation, substantially as described.

2. In a torpedo launching apparatus, the combination of a tube, a breech-door, a muzzle-door, a member rotatable in one direction for opening the muzzle-door, a ratchet associated with said member, a pawl movable into and out of an operative position in which it coacts with the ratchet to prevent rotation of said member in the said direction, and means controlled by the position of the breech-door for causing the pawl to assume its operative position when the breech-door is opened; substantially as described.

3. In a torpedo-tube installation, the combination of a first tube, a second tube, a breech-door for each tube, a muzzle-door for each tube, a rotatable member for opening each muzzle-door, a locking device for each of said members, a single spring for moving both of said locking devices to locking position, and means controlled by the movements of each of the breech-doors whereby the rotatable member of the corresponding muzzle-door will be locked by the action of said spring when the breech-door is moved to the open position; substantially as described.

4. In a torpedo-tube installation, the combination of a first tube, a second tube, a muzzle-door and a breech-door for each tube, a mechanical interlock for the muzzle-door and breech-door of each of said tubes, each of said interlocks including a rotatably mounted locking member, and a single spring connecting said members and acting always to urge both of said members toward their muzzle-door locking positions; substantially as described.

5. In a torpedo-tube installation, the combination of a first tube, a second tube, a muzzle-door and a breech-door for each tube, a mechanical interlock for the muzzle-door and breech-door of each of said tubes, each of said interlocks including a pivoted locking lever, and a spring connecting said levers and acting always to urge both of said levers toward their locking positions; substantially as described.

6. In a torpedo launching apparatus, the combination of a tube, a muzzle-door, a breech-door, a shaft extending lengthwise of the tube and connected to the muzle-door for opening and closing the same, a rotatable member coöperating with said shaft to effect lengthwise movement thereof, and a stop for permitting or preventing rotation of said rotatable member and controlled by the position of the breech-door; substantially as described.

7. In a torpedo launching apparatus, the combination of a tube, a muzzle-door, a breech-door, a shaft extending lengthwise of the tube and connected to the muzzle-door for opening and closing the same, a rotatable member coöperating with said shaft to effect lengthwise movement thereof, a stop for permitting or preventing rotation of said rotatable member and controlled by the position of the breech-door, and a stop for the breech-door positioned by the lengthwise movement of said shaft; substantially as described.

8. In a torpedo launching apparatus, the combination of a tube, a muzzle-door therefor, a breech-door provided with spaced locking lugs thereon, spaced locking lugs on the tube with which the lugs of the breech-door coact, an operating mechanism for closing and opening the muzzle-door and a lock for said operating mechanism extending through the tube in position to be operated by a lug of the breech-door; substantially as described.

9. In a torpedo launching apparatus, the combination of a tube, a muzzle-door therefor, a breech-door provided with spaced locking lugs thereon, spaced locking lugs on the tube with which the lugs of the breech-door coact, operating mechanism for closing and opening the muzzle-door, a lock for said operating mechanism extending through the tube in position to be operated by a lug of the breech-door, and a stop for permitting or preventing rotational movement of the breech-door positioned by the mechanism for opening and closing the muzzle-door; substantially as described.

10. In a torpedo launching apparatus, the combination of a tube, a breech-door, a shaft connected to the breech-door and movable lengthwise to open and close that door, a rotatable member connected to said shaft for causing lengthwise movement thereof, a breech-door provided with spaced locking lugs, coacting locking lugs on the tube, a lever passing through the tube into position for coaction with the lugs of the breech-door, and a ratchet on said rotatable member with which said lever coacts to permit or prevent operation of said member to open or close the muzzle-door; substantially as described.

11. In a torpedo launching apparatus, a tube, a muzzle-door therefor, a longitudinally movable non-rotatable threaded shaft connected to the muzzle-door for opening and closing the same, a threaded operating member coacting with said shaft and mounted for rotation but held against longitudinal movement; and mechanism for controlling the operation of the apparatus coacting with the longitudinally movable shaft and with said rotatable member; substantially as described.

12. In a torpedo launching apparatus, a tube, a muzzle-door therefor, a longitudinally movable non-rotatable threaded shaft connected to the muzzle-door for opening and closing the same, a threaded operating member coacting with said shaft and mounted for rotation but held against longitudinal movement, a breech-door for the tube, and means controlled by the position of the breech-door for permitting or preventing rotation of said rotatable member; substantially as described.

13. In a torpedo launching apparatus, the combination of a tube, a muzzle-door for the tube, a breech-door for the tube, an interlock for preventing opening of either one of said doors while the other is open, means for admitting compressed air to the tube to discharge a torpedo therefrom, a valve controlling the supply of compressed air to the tube, and an operating mechanism for opening the muzzle-door and also opening said valve and arranged to open the valve after the muzzle-door has been completely opened; substantially as described.

14. In a torpedo launching apparatus, the combination of a tube, a muzzle-door and a breech-door for the tube, locks for said doors preventing either door from being opened while the other is open, means for admitting compressed air to the tube to discharge a torpedo therefrom, a valve for controlling the supply of compressed air to the tube, and an operating mechanism for opening the muzzle-door, operating the lock for the breech-door, and opening said valve, arranged to first lock the breech-door, then open the muzzle-door and open said valve on a complete opening of the muzzle-door; substantially as described.

15. In a torpedo launching apparatus, the combination of a plurality of tubes, a muzzle-door and a breech-door for each tube, locks for the doors of each tube and operating mechanism therefor preventing either door of a tube from being opened while the other door of that tube is open, means for supplying compressed air to all the tubes to discharge torpedoes therefrom, and means for controlling the supply of compressed air to the tubes comprising a source of supply of compressed air, a selecting valve, a conduit leading from the source of supply to the selecting valve, a plurality of pipes extending from the selecting valve and each corresponding to one of the tubes, the movable member of the selecting valve being movable to connect any one of said pipes to said conduit, and a valve in each of said pipes which is opened by the mechanism for opening the muzzle door of the corresponding tube; substantially as described.

16. In a torpedo launching apparatus, a plurality of tubes, means for supplying compressed air to the tubes to discharge torpedoes therefrom, a source of supply of compressed air, a selecting valve, a conduit leading from said source to said valve, a plurality of pipes leading from the valve and each corresponding to one of the tubes, a movable member of the valve being movable to connect any one of said pipes to said conduit, a controlling valve in each of said pipes, and means for operating said controlling valves; substantially as described.

17. In a torpedo launching apparatus, the combination of a plurality of tubes, doors for said tubes, operating mechanisms for said doors, means for admitting compressed air to the tubes to discharge torpedoes therefrom, and means for controlling the supply of compressed air to the tubes comprising a source of supply of compressed air, a selecting valve, a conduit leading from the source to the valve, a plurality of pipes leading from the valve and each corresponding to one of the tubes, a valve in each of said pipes, and means for opening each of said valves by operation of the door-opening mechanism of the corresponding tube; substantially as described.

18. In a torpedo launching apparatus, a plurality of tubes, means for discharging torpedoes therefrom, controlling means for the discharging means operated at the tube in preparing the tube for launching a torpedo therefrom, master controlling devices located at a distant firing station for controlling the discharge of torpedoes from the tubes, signaling devices at the firing station, each corresponding to a tube, and means actuated by the operation of said controlling means in preparing a tube for the launching of a torpedo therefrom for actuating the corresponding signaling device to give an indication at the firing station of the tube which is in readiness for firing; substantially as described.

19. In a torpedo launching apparatus, the combination of a plurality of tubes, means for admitting compressed air to the tubes to discharge torpedoes therefrom, means for controlling the supply of compressed air to the tubes comprising a source of supply of compressed air, a conduit leading therefrom, a selector valve to which the conduit is connected and pipes corresponding to the tubes leading from the selector valve and each adapted to be connected by the valve to said conduit, means for controlling the supply of compressed air through said conduit from a distant point, a plurality of signaling devices at the distant point, and means controlled by the position of the movable member of the selecting valve for actuating said signal devices; substantially as described.

20. In a torpedo launching apparatus, the combination of a plurality of tubes, a muzzle-door for each tube, means for supplying compressed air to the tubes to discharge torpedoes therefrom, and means for controlling the supply of compressed air comprising a source of supply of compressed air, a conduit leading therefrom, a selecting valve to which the conduit is connected, a plurality of pipes, one corresponding to each tube connected to the selecting valve and each adapted to be connected to said conduit by the valve, a controlling valve in each of said pipes, a mechanism for opening the muzzle door of each tube, and means operated by said mechanism for opening the controlling valve in the pipe of the corresponding tube; substantially as described.

21. In a torpedo launching apparatus, the combination of a plurality of tubes, a valve for each tube for admitting compressed air to the tube to discharge a torpedo therefrom, pneumatic controlling means for said valves including pipes connected to the valves, a selecting valve to which all of said pipes are connected, a source of supply of compressed air connected to the selecting valve, the selecting valve being adapted to connect said source to any one of said pipes, a firing device at a distant station, and a plurality of signaling devices at the distant station, each of which is operated automatically by movement of the movable member of the selecting valve to the position for connecting the source of supply of compressed air to one of said pipes.

22. In a torpedo-tube installation, the combination of a plurality of torpedo-tubes, a tube selector valve, a conduit leading from a source of fluid pressure supply to said valve, and a plurality of individual connections one for each of the tubes leading thereto from said valve, the valve being selectively adjustable to open any one and that one only of said individual conduits, a plurality of normally closed valves one interposed in each of said individual conduits, and means for opening any one of said valves; substantially as described.

23. In a torpedo-tube installation, the combination of a plurality of torpedo-tubes, breech and muzzle closures for the tubes and operating means therefor, a conduit from a source of fluid pressure supply, a multi-way tube selector valve to which said conduit leads, a plurality of individual connections one for each of the tubes leading thereto from said valve, and an interlocking valve in each of said connections actuated by the said operating means, said selector valve being manually operable, irrespective of the actuation of said operating means, to place a selected one of the said individual connections in communication with said conduit; substantially as described.

24. In a torpedo-tube installation, the combination of a plurality of tubes, torpedo-fire-control mechanism therefor including a normally closed tube selector valve, a conduit leading from a source of fluid pressure supply to the valve, a plurality of individual connections one for each of the tubes leading thereto from said valve, a normally closed interlock valve interposed in each of said individual connections, a muzzle-cap for each tube, and means for opening each cap and the interlock valve of the corresponding tube; substantially as described.

25. In a torpedo-tube installation, the combination of a plurality of torpedo-tubes, movable muzzle closures for the tubes, means for ejecting torpedoes from the tubes including a tube selector valve, a conduit leading to the valve and a plurality of individual connections leading from the valve each to a different one of said tubes, and means independent of and additional to said selector valve for opening any one of said individual connections when opening the muzzle door of the corresponding tube; substantially as described.

26. In a torpedo-tube installation, the combination of a plurality of torpedo-tubes, a movable muzzle closure for each tube, a plurality of normally closed tube-serving conduits one for each tube, a normally closed common feed-conduit for all the tube-serving conduits, means adapted upon opening any one of said muzzle closures to open the corresponding tube-serving conduit, and a master firing device located at a distant firing station for opening the common feed-conduit; substantially as described.

27. In a torpedo-tube installation, the combination of a plurality of grouped torpedo-tubes, a tube selector valve, a conduit leading thereto from a source of fluid pressure supply, a plurality of pipes leading from said valve to said tubes, means for positioning said valve to place said conduit in communication with one of said pipes, a normally closed firing valve interposed in said conduit, and means operable from a distant point to open the firing valve; substantially as described.

28. In a torpedo-tube installation, the combination of a plurality of grouped torpedo-tubes, a source of fluid pressure supply, a passage for compressed air from said source to the tubes including a plurality of conduits each closed at a plurality of points and each leading to one of said tubes, means operable at said tubes to open the passage leading to any one of said tubes at a plurality of points but not at all points, and means operable at a point distant from the tubes to completely open the passage; substantially as described.

29. In a torpedo-tube installation, in combination, a plurality of grouped torpedo-tubes, muzzle closures for said tubes and operating means therefor, a source of fluid pressure supply, a normally closed tube selector valve, a conduit leading from said source to said valve, a plurality of pipes leading from said valve each to one of the tubes, said valve being selectively adjustable to place said conduit in communication with one of said pipes, a normally closed interlock valve interposed in each pipe, means for opening an interlock valve when and only when the muzzle of the corresponding tube is open, a normally closed valve interposed in said conduit, and means for opening the valve last mentioned from a point distant from the tubes; substantially as described.

30. In a torpedo-tube installation, the combination of a plurality of grouped torpedo-tubes, breech and muzzle closures for said tubes, means for preventing the opening of any one of said closures while the other closure of the same tube is open, a source of fluid pressure supply, a normally closed tube selector valve, a conduit leading from said source to said valve, a plurality of pipes leading from said valve each to one of the tubes, said valve being selectively adjustable to place said conduit in communication with any one of said pipes, a normally closed interlock valve interposed in each pipe and opened when and only when the muzzle closure of the corresponding tube is open, a normally closed valve interposed in said conduit, and means for opening the valve last mentioned from a point distant from the tubes; substantially as described.

31. In a torpedo-tube installation, in combination, a torpedo-tube, a muzzle-door therefor, means for opening said muzzle-door, a conduit leading from a source of fluid pressure supply, a manually operated valve interposed in said conduit, a normally closed valve interposed in said conduit and adapted to be opened automatically when opening the muzzle-door, a local signal device controlled by said means and adapted to indicate whether or not the muzzle-door is open and a firing device located at a distant firing station for controlling the passage of air through said conduit; substantially as described.

32. In a torpedo launching apparatus, the combination of a plurality of tubes, a muzzle-door for each tube, operating means for each door, conduits for admitting compressed air to the tubes to expel torpedoes therefrom, controlling means for said conduits operable from a distant firing station, means for preventing the admission of compressed air to a tube to expel a torpedo therefrom except when the muzzle-door of that tube is open, a plurality of signaling devices at the firing station, one for each tube, and means for operating the signaling devices automatically in preparing a tube for the expulsion of a torpedo therefrom by opening its muzzle door and permitting the admission of compressed air to the tube to indicate which of the tubes will receive the compressed air when the controlling means at the firing station is operated; substantially as described.

33. In a torpedo launching apparatus, the combination of a plurality of torpedo-tubes, a muzzle-door for each tube, a conduit connected to each tube for admitting compressed air to the tube to expel a torpedo therefrom, a mechanism for each tube operated by a gunner at the tubes for opening the muzzle-door of a tube and for permitting the supply of compressed air through the conduit of that tube, an operating device at a distant firing station for controlling the supply of compressed air to the tubes, and a plurality of signaling devices at the distant firing station each corresponding to one of said tubes and each controlled by the said mechanism of the corresponding tube operated by the gunner at the tubes; substantially as described.

34. In a torpedo launching apparatus, the combination of a plurality of tubes, means for admitting compressed air to any one of the tubes for expelling a torpedo therefrom, a normally inoperative firing device at a distant firing station for controlling the admission of air by said means to any one of the several tubes, a plurality of signaling devices at the distant firing station each corresponding to one of the tubes, and means operated by the gunner at the tubes for clearing the line of fire of any one of the tubes, for rendering said firing device at the distant station operative and for causing the signaling device at the distant station which corresponds to the tube whose line of fire has been cleared to give a signal; substantially as described.

35. In a torpedo launching apparatus, the combination of a plurality of torpedo tubes, a muzzle-door for each tube, a valve for each tube controlling the admission of compressed air to the tube to expel a torpedo therefrom, means actuated by the gunner at the tubes for opening the muzzle-door of a selected tube and for permitting the operation of the valve of that tube, a single firing device located at a distant firing station adapted to be operated to launch a torpedo from any one of the several tubes, a plurality of signaling devices at the distant firing station each corresponding to one of the tubes, and means operated by the gunner in opening the muzzle-door of a selected tube and permitting the actuation of the valve of that tube for causing the corresponding signaling device at the distant firing station to display its signal.

36. A torpedo launching apparatus comprising the combination of a tube, a breech door, a muzzle-door, a lever, a locking bolt for the breech door connected to the lever, a spring associated with the lever for moving the bolt to its operative position, means for opening and closing the muzzle door, an arm adapted to engage the lever to hold the bolt inoperative when the muzzle door is closed, and mechanism actuated by said means for causing the arm to disengage the lever when the muzzle door is opened; substantially as described.

In testimony whereof I affix my signature.

HUGO E. GRIESHABER.